(12) United States Patent
Park et al.

(10) Patent No.: US 7,446,846 B2
(45) Date of Patent: Nov. 4, 2008

(54) LIQUID CRYSTAL DISPLAY DEVICE AND FABRICATION METHOD THEREOF

(75) Inventors: Jung-Mu Park, Busan (KR); Sung-Hwan Cho, Gyeongsangbuk-Do (KR)

(73) Assignee: LG Display Co. Ltd., Seoul (KR)

( * ) Notice: Subject to any disclaimer, the term of this patent is extended or adjusted under 35 U.S.C. 154(b) by 363 days.

(21) Appl. No.: 11/321,455

(22) Filed: Dec. 30, 2005

(65) Prior Publication Data

US 2007/0000430 A1    Jan. 4, 2007

(30) Foreign Application Priority Data

Jun. 29, 2005    (KR) .................... 10-2005-0057393

(51) Int. Cl.
G02F 1/1339    (2006.01)
(52) U.S. Cl. .................. 349/190; 349/153; 349/158
(58) Field of Classification Search .............. 349/153, 349/190
See application file for complete search history.

(56) References Cited

U.S. PATENT DOCUMENTS

| | | | |
|---|---|---|---|
| 6,819,389 B2 * | 11/2004 | Imayama et al. | 349/153 |
| 6,873,391 B2 * | 3/2005 | Jun et al. | 349/158 |
| 7,173,683 B2 * | 2/2007 | Hur et al. | 349/147 |
| 2005/0280765 A1 * | 12/2005 | Wu et al. | 349/153 |

* cited by examiner

*Primary Examiner*—Richard H Kim
(74) *Attorney, Agent, or Firm*—Morgan Lewis & Bockius LLP

(57) ABSTRACT

A method for fabricating an LCD device includes preparing a first substrate,
preparing a second substrate such that each of the first and second substrates corresponding to a plurality of panels, forming a seal pattern along an outer edge of each panel on the second substrate, forming a plurality of holes at an outer edge of the first substrate, dotting a slide preventing adhesive on the first substrate at portions corresponding to the holes, and attaching the first substrate and the second substrate.

21 Claims, 5 Drawing Sheets

LIQUID CRYSTAL DISPLAY DEVICE AND FABRICATION METHOD THEREOF

The present application claims the benefit of Korean Patent Application No. 57393/2005 filed in Korea on Jun. 29, 2005, which is hereby incorporated by reference.

BACKGROUND OF THE INVENTION

1. Field of the Invention

The present invention relates a liquid crystal display (LCD) device, and more particularly, to an LCD device with enhanced picture quality achieved by preventing seal pattern spots (blurs) due to a slide preventing adhesive on a substrate applied during an attaching process.

2. Description of the Related Art

Recently, as various mobile electronic devices including mobile phones, personal digital assistants (PDAs), and notebook computers are being developed, demands for a light, thin, short, and small flat panel display device are increasing. As a result, research and development for flat panel display devices, such as LCDs (liquid crystal displays), PDPs (plasma display panel), FEDs (field emission display), and VFD (vacuum fluorescent displays) are actively ongoing. Of these displays, the LCD is the one of most interest because of its implementation of mass-production techniques, ease in driving, and high picture quality.

FIG. 1 is a schematic sectional view of a general LCD. As shown, the general LCD device includes a lower substrate 5, an upper substrate 3, and a liquid crystal layer 7 formed between the lower and upper substrates 5 and 3. The lower substrate 5 is a driving device array substrate. Though not shown, a plurality of pixels is formed on the lower substrate 5 and each pixel includes a driving device, such as a thin film transistor (TFT). The upper substrate 3 is a color filter substrate and includes a color filter layer for implementing actual colors. A pixel electrode and a common electrode are formed on the lower and upper substrates 5 and 3, respectively, and an alignment film for aligning liquid crystal molecules of the liquid crystal layer 7 is coated thereon.

The lower and upper substrates 5 and 3 are attached by a seal pattern (seal material) 9 and the liquid crystal layer 7 is formed between the seal patterns. Information is displayed by controlling the amount of light transmitted through the liquid crystal layer by driving liquid crystal molecules using the driving device formed on the lower substrate 5.

The process of fabricating the LCD device can be divided into a driving device array substrate process for forming the driving device on the lower substrate 5, a color filter substrate process for forming color filters on the upper substrate 3, and a cell process. The processes of fabricating the LCD device will now be described with reference to FIG. 2.

First, in the driving device array substrate process, a plurality of gate lines and data lines are arranged to define pixel regions on the lower substrate 5, and a TFT, namely, the driving device, connected with the gate line and the data line is formed at each pixel region (step S101). In addition, a pixel electrode is formed connected with the TFT to drive the liquid crystal layer according to a signal applied thereto through the TFT. In the color filter substrate process, R, G, and B (red, green, and blue) color filter layers for implementing color and the common electrode are formed on the upper substrate 3 (step S104).

Subsequently, an alignment film is formed on the upper and lower substrates 5 and 3, respectively, and rubbed to provide an alignment control force or a surface fixing force (namely, a pre-tilt angle and an alignment direction) to liquid crystal molecules of the liquid crystal layer formed between the upper and lower substrate 5 and 3 (steps S102 and S105). Thereafter, spacers for uniformly maintaining a cell gap are spread on the lower substrate 5, a seal pattern is coated at an outer edge of the upper substrate 3, and then, the lower and upper substrates 5 and 3 are attached to each other by applying a certain pressure thereto (steps S103, S106 and S107).

The upper and lower substrates 5 and 3 are formed from a large-size glass substrate. Specifically, a plurality of panel regions are formed on a large-scale glass substrate and the TFT, namely, the driving device, and the color filter layer are formed at each panel region. To fabricate each liquid crystal panel, the glass substrates are cut and processed (step S108). Then, liquid crystal is injected into each processed liquid crystal panel through a liquid crystal injection opening, and the liquid crystal injection opening is sealed to form a liquid crystal layer (step S109). Thereafter, each liquid crystal panel is tested to complete the fabrication of the LCD device (step S110).

The attaching process is performed by the seal pattern formed on the upper substrate, and in this case, an adhesive for preventing sliding of the upper substrate is formed at an outer edge of the lower substrate. Namely, as shown in FIG. 3, a slide preventing adhesive 11 is formed at the outer edge of the lower substrate 5 and prevents the upper substrate 3 from sliding with respect to the lower substrate 5 so that the attached alignment between the upper substrate 3 and the lower substrate 5 is not be distorted.

The adhesive 11 is dropped onto the lower substrate 5 in a dot form, and when the upper substrate 3 is pressed to be attached with the lower substrate, the adhesive 11 is pressed by the upper substrate 3. At this time, the adhesive 11 spreads out to the region of the seal pattern 9, and in this case, after the attaching, the seal pattern 9 is separated along the region intruded by the adhesive 11. Because of the separation of the seal pattern 9 caused by the adhesive 11, spots are generated due to a defective gap of the seal pattern 9, thereby degrading a picture quality.

SUMMARY OF THE INVENTION

Accordingly, the present invention is directed to a liquid crystal display device and fabrication method thereof that substantially obviates one or more of the problems due to limitations and disadvantages of the related art.

An object of the present invention is to provide a liquid crystal display (LCD) device and its fabrication method that prevents degradation of a picture quality due to a defective gap of a seal pattern by preventing an adhesive, which is provided to prevent sliding of an upper substrate during a attaching process, from spreading around the seal pattern.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a method for fabricating an LCD device comprises preparing a first substrate; preparing a second substrate, each of the first and second substrates corresponding to a plurality of panels; forming a seal pattern along an outer edge of each panel on the second substrate; forming a plurality of holes at an outer edge of the first substrate; dotting a slide preventing adhesive on the first substrate at portions corresponding to the holes; and attaching the first substrate and the second substrate.

In another aspect, a method for fabricating an LCD device comprises preparing a first substrate; preparing a second substrate; forming a plurality of gate lines and gate pads arranged in a first direction on the first substrate; forming a gate insulation film on the entire surface of the first substrate including the gate lines and the gate pads; forming data lines crossing over the gate lines to define an image display portion including a plurality of pixels and data pads on the gate insulation film; forming a passivation film on the entire surface of the first substrate including the data line and the data pad; removing a portion of the gate insulation film and the passivation film to form gate and data contact holes to expose a portion of the gate pad and the data pad, respectively, and a plurality of adhesive holes formed at an outer edge of the first substrate; forming a pixel electrode on the passivation film of the image display portion, a gate connection pad connected with the gate pad through the gate contact hole, and a data connection pad connected with the data pad through the data contact hole; dotting a slide preventing adhesive at an upper portion of the adhesive holes; attaching the first and second substrates; and cutting the attached first and second substrates to obtain a plurality of separated liquid crystal panels.

In another aspect, an intermediate product for fabricating a liquid crystal display (LCD) device comprises first and second substrates defining a plurality of image display portions defined thereon, a plurality of holes formed at an outer edge of the first substrate; a slide preventing adhesive dotted at an upper portion of the holes; a seal pattern formed along an outer edge of each image display portion on the second substrate; and a liquid crystal layer formed between the first and second substrates.

In another aspect, a liquid crystal display (LCD) device comprises first and second substrates attached to each other and defining a display portion, the first substrate including a plurality of holes along at least one side the first substrate; a slide preventing adhesive dotted at an upper portion of the holes; a seal pattern formed along an outer edge of the display portion on the second substrate; and a liquid crystal layer formed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
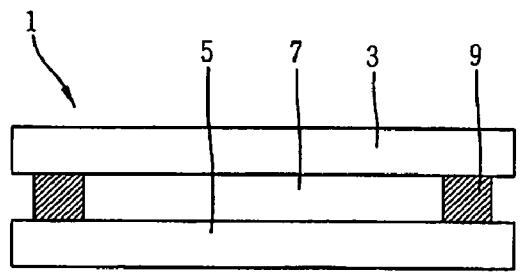
FIG. 1 is a sectional view of a general LCD device.
Figure 2:
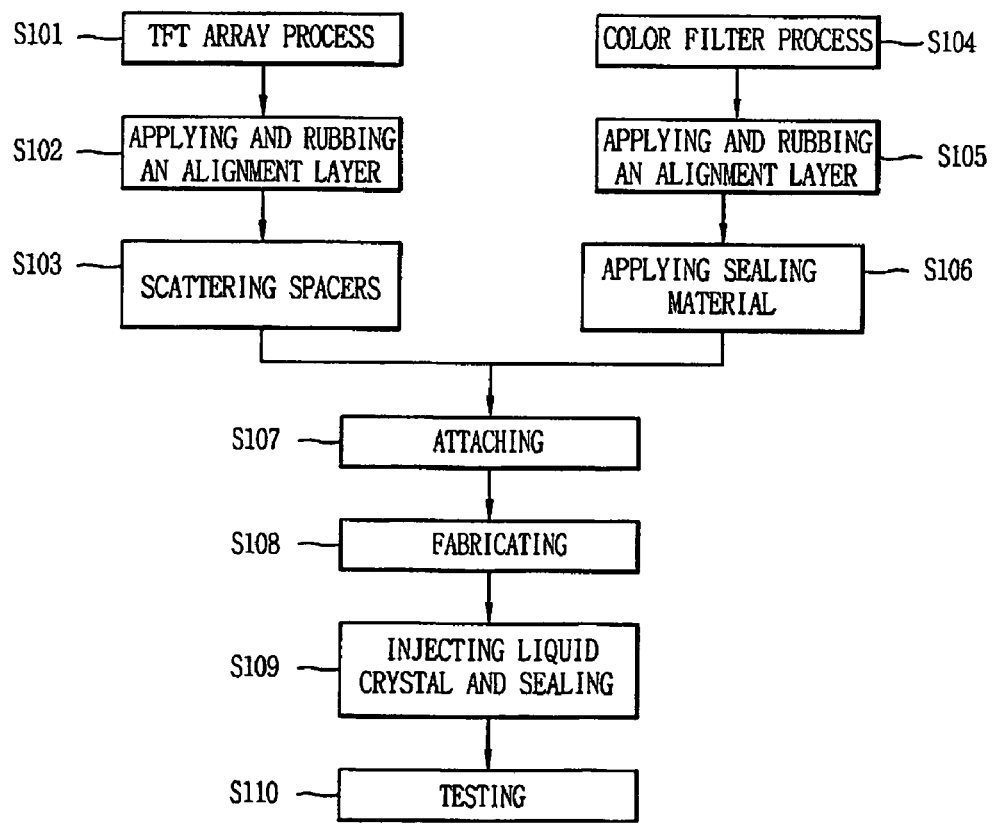
FIG. 2 is a flow chart showing a method for fabricating an LCD device in accordance with the related art.
Figure 3:
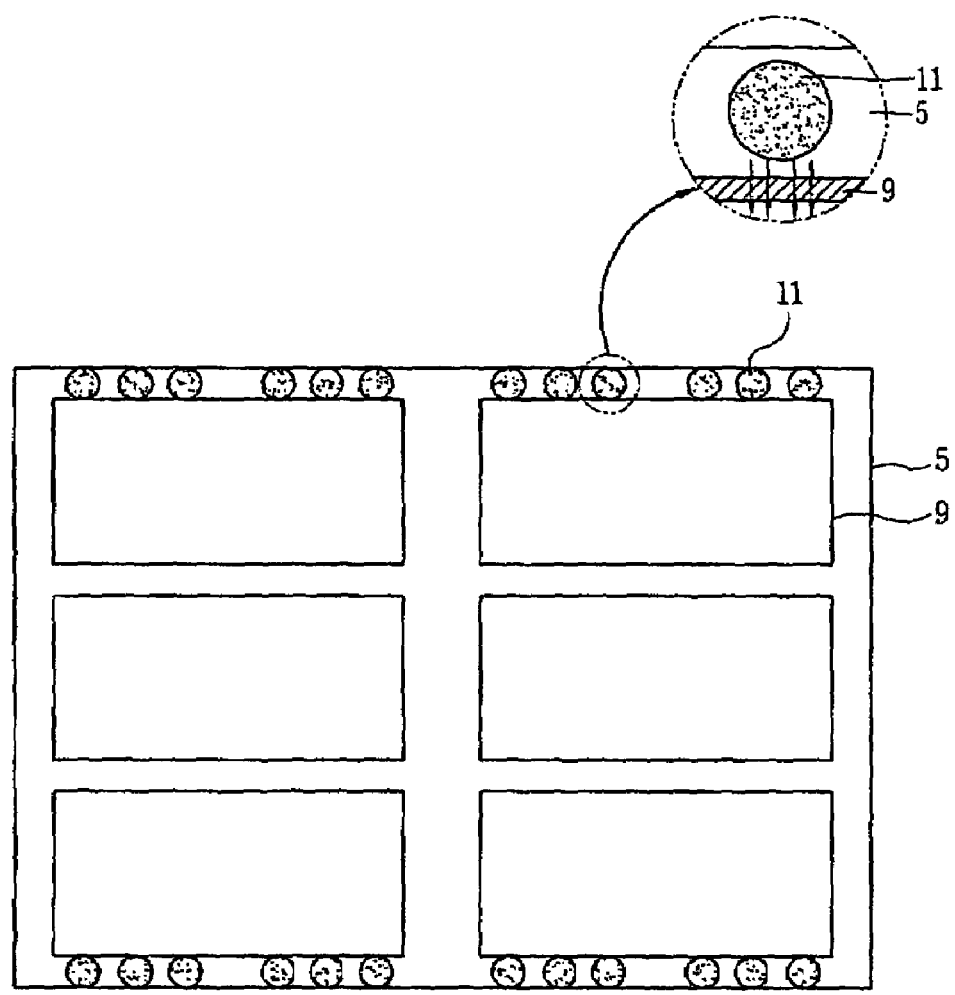
FIG. 3 is a schematic plan view showing a lower substrate of a related art LCD device.
Figure 4:
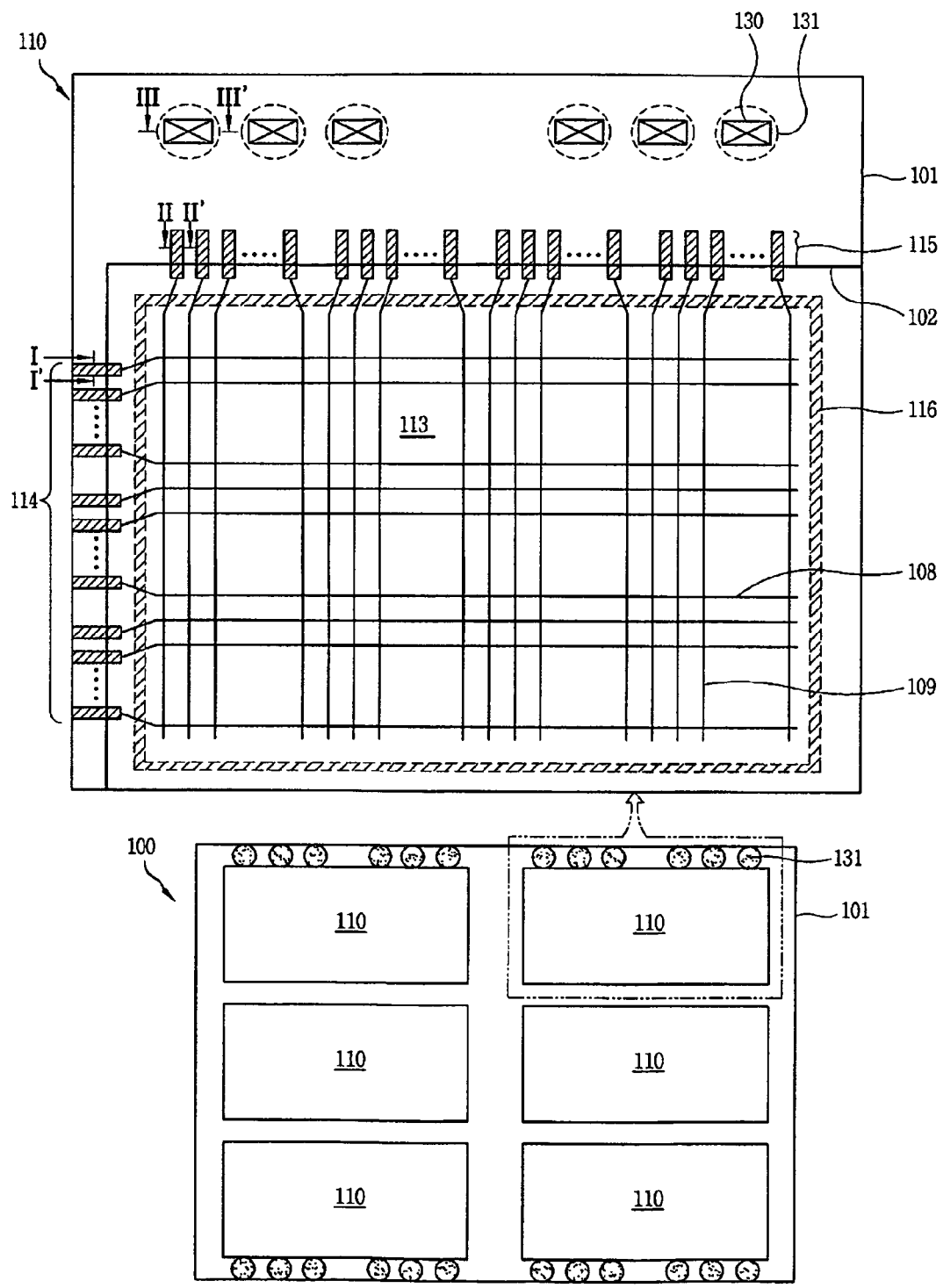
FIG. 4 is a schematic plan view showing a lower substrate of an exemplary LCD device in accordance with the present invention.

FIG. 4 is a schematic plan view showing a lower substrate of an exemplary liquid crystal display (LCD) device in accordance with the present invention. In the LCD device, lower and upper substrates are attached by a seal pattern formed along an outer edge thereof, and a liquid crystal layer is formed between the first and second substrates. However, for the sake of explanation, only the lower substrate is shown before being cut to unit panels.

As shown, a plurality of thin film transistor (TFT) array substrates 110 are formed on a lower substrate 101 of the LCD device 100. The TFT array substrates 110 are individually separated by a cutting process after the lower substrate is attached with an upper substrate.

A seal pattern 116 for attaching the TFT array substrate 110 is formed on a portion of the upper substrate (color filter substrate) corresponding to an outer edge of the TFT array substrate 110. Only the seal pattern 116 is shown with omission of the upper substrate.

As shown in the enlarged view, the TFT array substrate 110 includes an image display 113 having liquid crystal cells arranged in a matrix form defined by a plurality of gate lines 108 arranged in a first direction and a plurality of data lines 109 crossing the gate lines 108 in a second direction, gate pads 114 connected with the gate lines 108 of the image display part 113 and transferring an external signal, and data pads 115 connected with the data lines 109. The gate pads 114 and the data pads 115 are formed at an edge region of the lower substrate 101 which does not overlap with the upper substrate. The gate pads 114 supply gate signals supplied from a gate driving circuit (not shown) to the gate lines 108, and the data pads 115 supply data signals supplied from the data driving circuit (not shown) to the data lines 109 of the image display 113.

Though not shown, a TFT as a switching device for switching each liquid crystal cell is formed at the crossing of the gate line 108 and the data line 109. The TFT includes a gate electrode, a semiconductor layer and source/drain electrodes. The gate electrode and the semiconductor layer are insulated by a gate insulation film (not shown) interposed therebetween. The gate insulation film is formed over the entire surface of the lower substrate 101, and a passivation film (not shown) for protecting the TFT is formed over the entire surface of the substrate. Accordingly, the gate insulation film and the passivation film are stacked on the lower substrate 101 except for the TFT array substrate 110.

In a TN (twisted nematic) mode LCD device, a pixel electrode is formed on the TFT array substrate 110 and a common electrode is formed on the upper substrate. By comparison, in an IPS (in plane switching) mode LCD device, a common electrode and a pixel electrode for generating an in-plane electric field are formed together on the TFT array substrate 110.

In addition, on the upper substrate, there are formed color filters coated separately on each cell region (at a portion of the TFT array substrate 110 corresponding to a switching device, a gate line 108 and a data line 109) and a black matrix for preventing light leakage and formed between the image display 113 and the gate and data pads 114, 115. An overcoat film can be formed on the entire surface of the upper substrate including the black matrix and the color filter.

A plurality of holes 130 are formed at an outer edge of the lower substrate 101 and an adhesive 131 in a dot form is formed at an upper portion of the hole 130. The adhesive 131 is formed to prevent sliding of the upper substrate 102 when the upper substrate contacts with the lower substrate 101 during an attaching process and can be formed at any position of the edge region of the lower substrate 101.

During the attaching process, the hole 130 provided at a lower portion of the adhesive 131 prevents spreading of the adhesive 131 to the periphery of the seal pattern 116 due to the pressing by the upper substrate. Namely, the adhesive 131 is collected into the hole 130 due to the pressing by the upper substrate rather than spreading around the seal pattern 116, so that a bulge phenomenon of the seal pattern due to the adhesive can be prevented. The attaching process will be described in detail afterwards.

The lower substrate of the thusly constructed LCD device is fabricated according to the TFT array substrate process. That is, the lower substrate 101 with defined unit panel regions is prepared, and then, the plurality of gate lines are arranged in the first direction on the lower substrate 101, and gate pads are formed at one side of the gate lines. At this time, the gate electrode of the TFT is also formed. Subsequently, the gate insulation film is formed on the entire surface of the substrate including the gate lines 108 and the gate pads 114, and the semiconductor layer is formed on the upper portion of the gate insulation film corresponding to the gate electrode. Thereafter, the data lines 109 vertically crossing over the gate lines 108 are formed, data pads 115 are provided at one side of the data line 109, and the source/drain electrodes are formed together on the semiconductor layer.

Subsequently, a passivation film is formed on the entire surface of the lower substrate including the data lines 109 and the data pads 115, and the passivation film and the gate insulation film are patterned to form a gate contact hole exposing a portion of the gate pads 114 and a data contact hole exposing a portion of the data pads 115. At this time, a plurality of holes exposing the lower substrate 101 can be also formed together at an outer edge of the lower substrate 101.

Figure 5A:
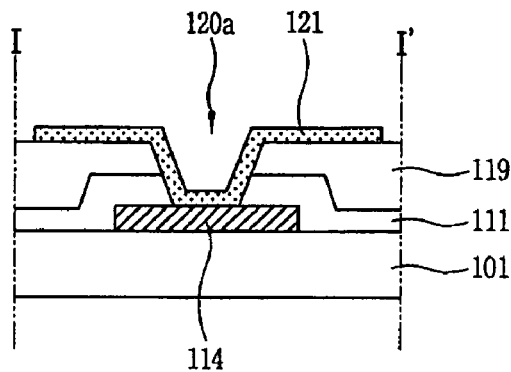
FIGS. 5A to 5C are sectional views taken along line I-I', II-II' and III-III' in FIG. 4.
Figure 5B:
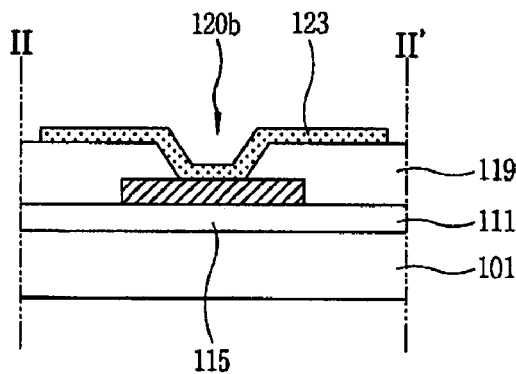
Figure 5C:
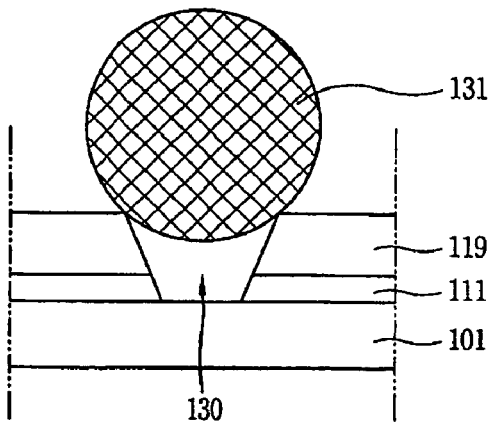

FIGS. 5A to 5C are sectional view taking along lines I-I', II-II', and III-III' in FIG. 4, showing each section of the gate pads, the data pads and the adhesive. As shown, the gate pads 114 are formed on the lower substrate, on which the gate insulation film 111 is formed. The data pads 115 are formed on the gate insulation film 111, on which a passivation film 119 is formed. A gate contact hole 120a is formed by removing the gate insulation film 111 and the passivation film 119, and a data contact hole 120b is formed by removing the passivation film 119. The hole 130 exposing the lower substrate 101 is formed by removing the gate insulation film 111 and the passivation film 119.

At this time, the gate/data contact holes 120a, 120b and the hole 130 can be formed during a masking process at one time so that, a masking process is not additionally performed to form the hole 130. The hole 130 can be formed in various forms, for example, a square form or a circular form. Subsequently, a gate connection pad 121 and a data connection pad 123 are formed to be connected with an external driving circuit on the passivation film 119. The gate pad 114 is connected with the gate connection pad 121 through the gate contact hole 120a and the data pad 115 is connected with the data connection pad 123 through the data contact hole 120b.

An adhesive 131 for preventing sliding of the upper substrate is dropped on the hole 130 provided at an outer edge of the lower substrate 101(FIG. 5C). When the lower substrate 101 with the adhesive 131 applied thereon is prepared, it is moved to an attaching apparatus and attached to the upper substrate with the seal pattern formed thereon.

Figure 6:
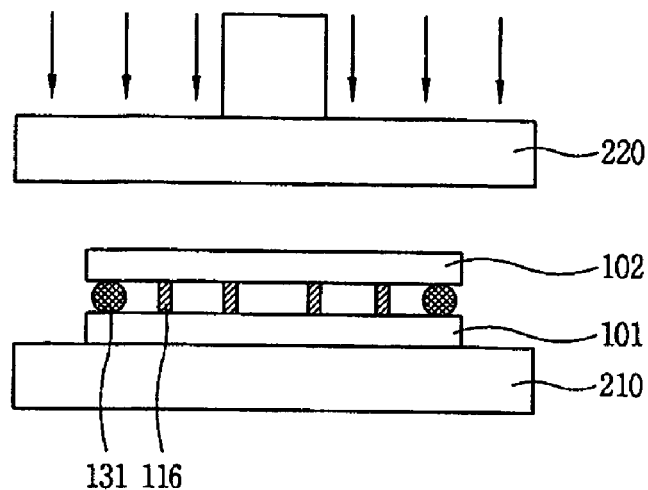
FIG. 6 is a schematic sectional view showing an attaching unit.

As shown in FIG. 6, the attaching apparatus includes an upper plate 220 and a lower plate 210 facing each other. When the attached lower substrate 101 and upper substrate 102 are loaded on the lower plate 210, the upper plate 220 descends at a certain speed to apply a certain pressure to the substrates. In this case, the upper and lower plates 210 and 220 are made of a material with high thermal capacitance, such as SUS, quartz glass, or iron, and during the attaching process, a high temperature of about 120° C.~140° C. is maintained.

While a uniform gap is maintained between the upper and lower substrates 102 and 101, the seal pattern 116 interposed therebetween is gradually hardened to completely attach the two substrates 101 and 102. At this time, before a pressure is applied to the upper substrate 102 from the upper plate 220, the upper substrate 102 is attached to the lower substrate 101 by the adhesive 131 formed at the outer edge of the lower substrate 101 to prevent sliding of the upper substrate 102 from the lower substrate 102. When a pressure is applied to the upper substrate 102 by the upper plate 220, the adhesive 131 is introduced into the holes 130 prepared at the lower side thereof.

Figure 7:
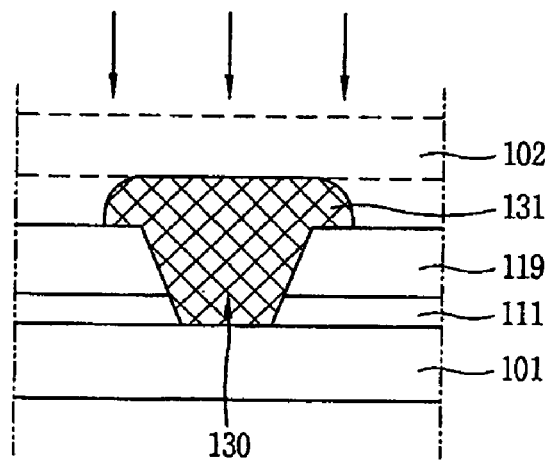
FIG. 7 is a sectional view showing an adhesive introduced into a hole during an attaching process.

In partricular, as shown in FIG. 7, when the pressure is applied to the upper substrate 102, the adhesive 131 is pressed by the upper substrate 102 and is introduced into the holes 130 provided at its lower portion due to the pressing of the upper substrate 102. Because the adhesive 131 is introduced into the holes 130 before spreading occurs around the seal pattern, a deficiency due to a possible bulge of the adhesive 131 can be prevented.

Meanwhile, a liquid crystal layer is formed between the lower and upper substrates 101 and 102. In this case, the liquid crystal layer can be formed by an injection method or a dispensing method. When the liquid crystal layer is formed by the injection method, a liquid crystal opening needs to be additionally provided at the seal pattern. After the attaching process is completed, liquid crystal is injected.

When the liquid crystal layer is formed by the dispensing method, liquid crystal is dispensing on the lower substrate and uniformly distributed over the entire panel by a pressure applied to the upper substrate during the attaching process. When using the dispensing method, liquid crystal can be directly dropped on the substrate within a short time so that the liquid crystal layer of a large-scale LCD device can be quickly made, thereby shortening the process time of the LCD device and enhancing the productivity. Finally, when the liquid crystal layer is dispensed and the upper and lower substrates are attached, the attached substrates are divided into unit panels through processing.

As mentioned above, in accordance with the present invention, the slide preventing adhesive is dotted at the outer edge of the lower substrate and the holes are formed at its lower portion to allow the adhesive to be introduced, thereby preventing its spreading around the seal during the pressing of the upper substrate. Regardless of a driving mode of the liquid crystal molecules, the LCD device in accordance with the present invention can be applied to a driving mode, such as a TN (twisted nematic) driving mode, an IPS (in plane switching) driving mode, and a VA (vertical alignment) driving mode.

As so far described, the LCD device and its fabrication method in accordance with the present invention have a number of advantages. For example, by forming the holes at the outer edge of the lower substrate to allow the slide preventing adhesive to be introduced thereinto, the adhesive can be prevented from spreading to the seal pattern region during the attaching process. Therefore, the bulge phenomenon of the seal pattern can be prevented and thus picture quality can be enhanced.

It will be apparent to those skilled in the art that various modifications and variations can be made in the liquid crystal display device and fabrication method thereof of the present invention without departing from the spirit or scope of the invention. Thus, it is intended that the present invention cover the modifications and variations of this invention provided they come within the scope of the appended claims and their equivalents.

What is claimed is:

1. A method for fabricating an LCD device, comprising:
   preparing a first substrate;
   preparing a second substrate, each of the first and second substrates corresponding to a plurality of panels;
   forming a seal pattern along an outer edge of each panel on the second substrate;
   forming a plurality of holes at an outer edge of the first substrate;
   dotting a slide preventing adhesive on the first substrate at portions corresponding to the holes; and
   attaching the first substrate and the second substrate.

2. The method of claim 1, further comprising forming a liquid crystal layer disposed between the first and second substrates.

3. The method of claim 2, wherein the liquid crystal layer is formed by an injection method.

4. The method of claim 2, wherein the liquid crystal layer is formed by a dispensing method.

5. The method of claim 1, further comprising cutting the attached first and second substrates to divided them into a plurality of liquid crystal panels.

6. The method of claim 1, wherein the preparing the first substrate includes:
   forming a plurality of gate lines arranged in a first direction on a transparent substrate;
   forming a plurality of data lines crossing over the gate lines to define a plurality of pixels; and
   forming a switching device to switch each pixel at each crossing of the gate lines and data lines.

7. The method of claim 1, wherein the preparing the second substrate includes:
   forming a black matrix on a transparent substrate; and
   forming a color filter.

8. The method of claim 1, wherein the attaching the first and second substrates includes:
   contacting the first substrate with the second substrate;
   pressing the second substrate to introduce the adhesive into the holes; and
   hardening the seal pattern to attach the first and second substrates.

9. A method for fabricating an LCD device, comprising:
   preparing a first substrate;
   preparing a second substrate;
   forming a plurality of gate lines and gate pads arranged in a first direction on the first substrate;
   forming a gate insulation film on the entire surface of the first substrate including the gate lines and the gate pads;
   forming data lines crossing over the gate lines to define an image display portion including a plurality of pixels and data pads on the gate insulation film;
   forming a passivation film on the entire surface of the first substrate including the data line and the data pad;
   removing a portion of the gate insulation film and the passivation film to form gate and data contact holes to expose a portion of the gate pad and the data pad, respectively, and a plurality of adhesive holes formed at an outer edge of the first substrate;
   forming a pixel electrode on the passivation film of the image display portion, a gate connection pad connected with the gate pad through the gate contact hole, and a data connection pad connected with the data pad through the data contact hole;
   dotting a slide preventing adhesive at an upper portion of the adhesive holes;
   forming a seal pattern along an outer edge of the image display portion on the second substrate;
   attaching the first and second substrates; and
   cutting the attached first and second substrates to obtain a plurality of separated liquid crystal panels.

10. The method of claim 9, wherein the attaching the first and second substrates includes:
    contacting the first substrate with the second substrate;
    pressing the second substrate to introduce the adhesive to an inner portion of the adhesive holes; and
    hardening the seal pattern to attach the first and second substrates.

11. The method of claim 9, wherein the preparing the second substrate includes:
    forming a black matrix on a transparent substrate; and
    forming a color filter on the transparent substrate.

12. An intermediate product for fabricating a liquid crystal display (LCD) device, comprising:
    first and second substrates defining a plurality of image display portions defined thereon, a plurality of holes formed at an outer edge of the first substrate;
    a slide preventing adhesive dotted at an upper portion of the holes;
    a seal pattern formed along an outer edge of each image display portion on the second substrate; and
    a liquid crystal layer formed between the first and second substrates.

13. The product of claim 12, wherein the first substrate includes:
    gate lines arranged in a first direction;
    data lines crossing the gate lines to define a plurality of pixels;
    a switching device formed at each crossing of the gate lines and data lines to switch each pixel; and
    a pixel electrode formed at each pixel.

14. The product of claim 13, wherein the first substrate further includes a common electrode separated with a certain interval from the pixel electrode to generate an in-plane electric field within the pixel.

15. The product of claim 12, wherein the second substrate includes:
    a black matrix; and
    a color filter.

16. The product of claim 15, wherein the second substrate further includes a common electrode formed on the color filter.

17. A liquid crystal display (LCD) device, comprising:
    first and second substrates attached to each other and defining a display portion, the first substrate including a plurality of holes along at least one side the first substrate;
    a slide preventing adhesive dotted at an upper portion of the holes;
    a seal pattern formed along an outer edge of the display portion on the second substrate; and
    a liquid crystal layer formed between the first and second substrates.

18. The device of claim 17, wherein the first substrate includes:
gate lines arranged in a first direction;
data lines crossing the gate lines to define a plurality of pixels;
a switching device formed at each crossing of the gate lines and data lines to switch each pixel; and
a pixel electrode formed at each pixel.

19. The device of claim 18, wherein the first substrate further includes a common electrode separated with a certain interval from the pixel electrode generate an in-plane electric field within the pixel.

20. The device of claim 17, wherein the second substrate includes:
a black matrix; and
a color filter.

21. The device of claim 20, wherein the second substrate further includes a common electrode formed on the color filter.

* * * * *